United States Patent [19]

Kokubo

[11] Patent Number: 4,699,947

[45] Date of Patent: * Oct. 13, 1987

[54] WEATHER AND IMPACT RESISTANT RESIN COMPOSITION AND PROCESS FOR ITS PREPARATION

[75] Inventor: Takashi Kokubo, Suzuka, Japan

[73] Assignee: Mitsubishi Monsanto Chemical Company, Tokyo, Japan

[*] Notice: The portion of the term of this patent subsequent to Jan. 28, 2003 has been disclaimed.

[21] Appl. No.: 814,794

[22] Filed: Dec. 30, 1985

Related U.S. Application Data

[62] Division of Ser. No. 620,710, Jun. 14, 1984, Pat. No. 4,585,832.

[30] Foreign Application Priority Data

Jun. 23, 1983 [JP] Japan ................................ 58-113511
Oct. 14, 1983 [JP] Japan ................................ 58-192214
Nov. 30, 1983 [JP] Japan ................................ 58-225784

[51] Int. Cl.$^4$ ............................................. C08L 51/04
[52] U.S. Cl. ...................................... 525/71; 525/73; 525/81; 525/82; 525/84; 525/85
[58] Field of Search ...................... 525/71, 73, 81, 82, 525/84, 85

[56] References Cited

U.S. PATENT DOCUMENTS 4,567,233 1/1986 Tomono et al. ...................... 525/71

Primary Examiner—Jacob Ziegler

Attorney, Agent, or Firm—Oblon, Fisher, Spivak, McClelland & Maier

[57] ABSTRACT

A weather and impact resistant resin composition which comprises: a graft copolymer (A) composed of a continuous phase comprising from 10 to 90% by weight of residues of an aromatic vinyl monomer, from 10 to 40% by weight of residues of an $\alpha,\beta$-unsaturated nitrile monomer and from 0 to 80% by weight of residues of methyl methacrylate, and particles of an acrylate rubber having a weight average particle size of from 0.1 to 0.45 $\mu$m dispersed in the continuous phase, said acrylate rubber comprising from 70 to 98% by weight of residues of an alkyl acrylate having from 2 to 12 carbon atoms, from 1.92 to 27% by weight of residues of a vinyl monomer copolymerizable with the alkyl acrylate and from 0.08 to 3% by weight of residues of a multifunctional vinyl monomer; a graft copolymer (B) composed of a continuous phase comprising from 10 to 90% by weight of residues of an aromatic vinyl monomer, from 10 to 40% by weight of residues of an $\alpha,\beta$-unsaturated nitrile monomer and from 0 to 80% by weight of residues of methyl methacrylate, and particles of a rubber having a weight average particle size of from 0.5 to 5 $\mu$m dispersed in the continuous phase; and a copolymer (C) comprising from 10 to 90% by weight of residues of an aromatic vinyl monomer, from 10 to 40% by weight of residues of an $\alpha,\beta$-unsaturated nitrile monomer and from 0 to 80% by weight of residues of methyl methacrylate; the content of the total rubber particles being from 5 to 40% by weight.

6 Claims, No Drawings

WEATHER AND IMPACT RESISTANT RESIN COMPOSITION AND PROCESS FOR ITS PREPARATION

This is a division, of application Ser. No. 620,710, filed June 14, 1984, now U.S. Pat. No. 4,585,832.

The present invention relates to a thermoplastic resin composition having excellent weather and impact resistance, and a process for its preparation.

Rubber-modified resins prepared by dispersing rubber particles in a matrix composed of e.g. a styrene-acrylonitrile copolymer, have excellent impact strength and moldability, and they are widely used as materials for electric appliances, parts of automobiles, etc. or boxes. As the rubber material, a conjugated diene polymer such as polybutadiene, polyisoprene or a styrene-butadiene copolymer (SBR) is widely employed. The conjugated diene polymer has a double bond in its molecule and thus readily undergoes crosslinking. Further, it has a feature that it readily forms a graft linkage with the matrix (the continuous phase). Thus, it is thereby possible to readily obtain a rubber-modified resin having excellent impact strength, i.e. a so-called ABS resin. On the other hand, such a rubber-modified resin has poor weather resistance because it contains the rubber material having a double bond in its molecule as mentioned above, and when exposed to the sun light, its physical properties deteriorate to a large extent. Therefore, it can not be used for e.g. boxes for instruments to be used outdoors.

As a means to solve such a problem, it has been known to use a saturated rubber material containing a little or no double bonds in its molecule, for instance, a polymer of an alkyl acrylate such as polybutyl acrylate, etc. or a monoolefin rubber material such as an ethylene-propylene-non-conjugated diene terpolymer (EPDM), etc. These saturated rubber-modified resins exhibit remarkable effectiveness in the improvement of the weather resistance, but they still has a difficulty in their mechanical property such as the impact strength. According to the study by the present inventors, this is attributable to the fact that the grafting reaction does not adequately proceed in the conventional acrylate polymer, and it used to be difficult to adequately control the particle size distribution for the reason that, in the case of e.g. EPDM, the solubility in the monomer is poor, or it is difficult to obtain a rubber material in a latex form.

Further, it is also known to improve the impact resistance by crosslinking a grafted polymer chain or a continuous phase (matrix) to acrylate rubber particles (Japanese Examined Patent Publication No. 34212/1980). However, the resin obtained by such a method has poor melt flow characteristics and thus has a difficulty in the moldability.

The present inventors have conducted extensive researches to obtain a weather and impact resistant resin composition having no such problems, and as a result have accomplished the present invention.

Namely, the present invention provides a weather and impact resistant resin composition which comprises: a graft copolymer (A) composed of a continuous phase comprising from 10 to 90% by weight of residues of an aromatic vinyl monomer, from 10 to 40% by weight of residues of an $\alpha,\beta$-unsaturated nitrile monomer and from 0 to 80% by weight of residues of methyl methacrylate, and particles of an acrylate rubber having a weight average particle size of from 0.1 to 0.45 μm dipersed in the continuous phase, said acrylate rubber comprising from 70 to 98% by weight of residues of an alkyl acrylate having from 2 to 12 carbon atoms, from 1.92 to 27% by weight of residues of a vinyl monomer copolymerizable with the alkyl acrylate and from 0.08 to 3% by weight of residues of a multifunctional vinyl monomer; a graft copolymer (B) composed of a continuous phase comprising from 10 to 90% by weight of residues of an aromatic vinyl monomer, from 10 to 40% by weight of residues of an $\alpha,\beta$-unsaturated nitrile monomer and from 0 to 80% by weight of residues of methyl methacrylate, and particles of a rubber having a weight average particle size of from 0.5 to 5 μm dispersed in the continuous phase; and a copolymer (C) comprising from 10 to 90% by weight of residues of an aromatic vinyl monomer, from 10 to 40% by weight of residues of an $\alpha,\beta$-unsaturated nitrile mcnomer and from 0 to 80% by weight of residues of methyl methacrylate; the content of the total rubber particles being from 5 to 40% by weight.

Such a composition can be prepared by a process which comprises copolymerizing from 100 to 60% by weight of an alkyl acrylate having an alkyl group of from 2 to 12 carbon atoms, from 0 to 40% by weight of a vinyl monomer copolymerizable with the alkyl acrylate and from 0 to 5% by weight of a multifunctional vinyl monomer to obtain an acrylate rubber latex having a weight average particle size of from 0.1 to 0.45 μm; polymerizing from 100 to 300 parts by weight, relative to 100 parts by weight of the solid content in said acrylate rubber latex, of a monomer mixture comprising from 10 to 90% by weight of an aromatic vinyl monomer, from 10 to 40% by weight of an $\alpha,\beta$-unsaturated nitrile monomer and from 0 to 80% by weight of methyl methacrylate, in the presence of said acrylate rubber latex to obtain a graft copolymer (A), wherein no chain transfer agent is added at the initial stage of the polymerization, and from 0.5 to 3 parts by weight of a chain transfer agent is added when not more than 70% by weight and from 50 to 100 parts by weight of the monomer mixture has been polymerized; and then blending the graft copolymer (A) with a graft copolymer (B) composed of a continuous phase comprising from 10 to 90% by weight of residues of an aromatic vinyl monomer, from 10 to 40% by weight of residues of an $\alpha,\beta$-unsaturated nitrile monomer and from 0 to 80% by weight of residues of methyl methacrylate, and particles of a rubber having a weight average particle size of from 0.5 to 5 μm dispersed in the continuous phase, and a copolymer (C) comprising from 10 to 90% by weight of residues of an aromatic vinyl monomer, from 10 to 40% by weight of residues of an $\alpha,\beta$-unsaturated nitrile monomer and from 0 to 80% by weight of residues of methyl methacrylate, to bring the content of the total rubber particles to a level of from 5 to 40% by weight of the composition.

Now, the present invention will be described in detail with reference to the preferred embodiments.

The copolymer (A) is preferably prepared by emulsion polymerization in view of the productivity and the physical properties of the copolymer thereby obtainable. However, it may be prepared also by suspension polymerization or emulsion-suspension polymerization.

As the acrylate to be used for the preparation of the copolymer (A), there may be mentioned esters of acrylic acid with a primary alcohol having from 2 to 12 carbon atoms, preferably from 4 to 8 carbon atoms.

Specifically, it is preferred to employ e.g. butyl acrylate or 2-ethylhexyl acrylate. If the carbon number is outside the above range, no adequate rubber elasticity is obtainable, such being undesirable. These esters may be used alone or in combination as a mixture of two or more different kinds.

Acrylate rubbers composed of acrylates having alkyl groups having a great number of carbon atoms, tend to reduce the effectiveness of the addition of the rubber material. Accordingly, it is preferred that they are copolymerized with a vinyl monomer copolymerizable with the alkyl acrylate, such as styrene or acrylonitrile.

The vinyl monomer copolymerizable with the acrylate is preferably such that the glass transition temperature (Tg) of the homopolymer thereof is at least room temperature. Specifically, there may be mentioned acrylonitrile, methacrylonitrile, styrene, α-methylstyrene, tert-butylstyrene, p-vinyl toluene, other vinyl toluenes, an alkyl methacrylate, 2-chloroethylvinyl ether, vinyl monochloroacetate or methoxy ethyl acrylate. When a vinyl monomer with Tg being lower than room temperature is employed, the impact strength tends to be inadequate.

As the multifunctional vinyl monomer, there may be mentioned divinyl benzene, ethylene glycol dimethacrylate, diallyl maleate, triallyl cyanurate, triallyl isocyanurate, diallyl phthalate, trimethylol propane triacrylate or allyl methacrylate (the term "allyl" means a $CH_2=CHCH_2-$ group).

By using such a multifunctional vinyl monomer, the crosslinking among the molecules of the acrylate polymer and the graft linkage with the matrix will be facilitated, whereby the impact resistance of the composition of the present invention will be improved. The acrylate copolymer used for the copolymer (A) may be prepared by a suspension polymerization, etc. However, from the viewpoints of the control of the particle size and the efficiency of the graft polymerization, it is preferred to employ an emulsion polymerization.

In the emulsion polymerization, a predetermined amount of the above-mentioned monomer mixture is emulsified in water by means of an emulsifier, and the polymerization is conducted by using a suitable initiator. As the emulsifier, it is possible to use a usual emulsifier of anion type, cation type or nonion type. However, it is preferred to use a fatty acid salt such as beef tallow soap, sodium stearate or sodium oleate, since the salting out operation is thereby facilitated.

As the polymerization initiator, there may be employed a persulfate such as potassium persulfate or ammonium persulfate; hydrogen peroxide; a redox type initiator obtained by a combination of such a persulfate or hydrogen peroxide with a reducing agent such as l-ascorbic acid, Rongalite, acidic sodium sulfite or ferrous chloride; or benzoyl peroxide, lauryl peroxide or azobisisobutyronitrile.

Other polymerization conditions may be the same as usual polymerization conditions.

The rubber in the graft copolymer (A), i.e. the above-mentioned acrylate polymer, usually has an average particle size of from 0.1 to 0.45 μm, preferably from 0.1 to 0.35 μm. Here, the "average particle size" is represented by a weight average particle size.

The particle size of such rubber particles is dependent on the average particle size of the rubber latex to be used for the graft polymerization. Therefore, in the case where the average particle size of the acrylate copolymer obtained by the above-mentioned emulsion polymerization is smaller than the desired value, it is preferred to adjust the particle size of the latex particles by conducting a so-called particle size growth operation wherein the latex particles are grown by partial flocculation by adding an acidic substance such as phosphoric acid, sulfuric acid or acetic anhydride to the latex.

If the average particle size of the rubber particles is less than 0.1 μm, no adequate improvement of the impact resistance will be obtained. On the other hand, if the average particle size exceeds 0.45 μm, the stability of the latex tends to be disturbed, and the impact resistance and surface gloss of the composition thereby obtainable tend to be inferior. After adjusting the particle size of the latex to a desired value, as the case requires, a monomer mixture comprising from 10 to 90% by weight of an aromatic vinyl monomer, from 10 to 40% by weight of an α,β-unsaturated nitrile monomer and from 0 to 80% by weight of methyl methacrylate, is added all at once or portionwise or continuously in an amount of from 100 to 300 parts by weight, relative to 100 parts by weight of the solid content of the acrylate copolymer latex, and the emulsion graft polymerization is conducted.

As the aromatic vinyl monomer, there may be employed styrene, α-methylstyrene, p-vinyltoluene, o-vinyltoluene or m-vinyltoluene.

As the α,β-unsaturated nitrile monomer, there may be employed acrylonitrile or methacrylonitrile.

If required, a polymerization initiator or other assisting agents may be added. The amount of the monomer mixture added to the rubber material i.e. to 100 parts by weight of the solid content of the acrylate copolymer latex is usually within a range of from 100 to 300 parts by weight. If the amount of the monomer mixture is outside the above range, the control of the rubber content in the composition of the present invention tends to be difficult, and the impact resistance tends to be deteriorated. Further, if the composition of the monomer mixture is outside the above specified range, the chemical resistance and the compatibility tend to be poor.

The polymerization is conducted without using a chain transfer agent at the initial stage of the emulsion graft polymerization. If the chain transfer agent is used at the initial stage of the polymerization i.e. during the stage before the polymerization of the monomer mixture reaches 50 parts by weight, the grafting rate with the acrylate rubber tends to be low, and accordingly the impact resistance and the outer appearance tend to be poor. The timing for the addition of the chain transfer agent is suitably at a time when not more than 70% by weight and from 50 to 100 parts by weight of the monomer mixture out of from 100 to 400 parts by weight of the monomer mixture added relative to 100 parts by weight of the solid content of the above-mentioned rubber latex, has been polymerized.

If the chain transfer agent is added after more than 70% by weight of the monomer mixture has been polymerized, no effectiveness will be obtained by the addition, and the polymerization degree of the matrix-forming resin tends to be too great. Consequently, the moldability of the obtained resin will be poor. Further, if the timing of the addition of the chair transfer agent is after more than 100 parts by weight of the monomer mixture has been polymerized, the moldability of the resin likewise tends to be poor even when the timing is before 70% by weight of the monomer mixture has been polymerized.

The amount of the chain transfer agent is usually from 0.5 to 3 parts by weight. If the amount is outside this range, it becomes difficult to obtain a resin having desired properties. With respect to the manner of the addition, the chain transfer agent may be added all at once or portionwise so long as the above-mentioned timing for the addition is satisfied.

There is no particular restriction as to the type of the chain transfer agent. However, it is preferred to use terpenes such as terpinolene, terpinene or limonene; mercaptanes such as tert-dodecylmercaptane; thioglycollic acid and its esters; or organic halides such as carbon-tetrachloride.

After the completion of the emulsion graft polymerization, an aqueous solution of an electrolyte such as $MgSO_4$, $Al_2(SO_4)_3$, NaCl, HCl or $CaCl_2$, is added for salting out, and the crumb thereby obtained is dehydrated and dried.

As the rubber particles for the copolymer (B), there may be employed an ethylene-propylene-non-conjugated diene rubber or a conjugated diene rubber such as polybutadiene or a styrene-butadiene copolymer.

The ethylene-propylene-non-conjugated diene rubber to be used for the preparation of the copolymer (B), is usually called EPDM, and usually has a ratio of ethylene/propylene (weight ratio) of from 80/20 to 30/70, preferably from 70/30 to 40/60 and a non-conjugated diene content of from 0.1 to 10 mol %.

As the non-conjugated diene, there may be employed, for instance, dicyclopentadiene, an alkylidene norbornene or 1,4-hexadiene.

100 parts by weight of such EPDM is dissolved in from 20 to 150 parts by weight of a monomer mixture comprising from 10 to 90% by weight of an aromatic vinyl monomer, from 10 to 40% by weight of an $\alpha,\beta$-unsaturated nitrile monomer and from 0 to 80% by weight of methyl methacrylate, and graft-polymerized under stirring by mass-suspension or mass polymerization.

In this case, EPDM is hardly soluble in the $\alpha,\beta$-unsaturated nitrile monomer, and if the amount of the monomer mixture is small, it is preferred to add a nonpolymerizable organic solvent such as heptane, hexane or octane, or to dissolve it in an organic vinyl monomer or in a mixture of an organic vinyl monomer and methyl methacrylate and add the $\alpha,\beta$-unsaturated nitrile monomer during the polymerization.

As the polymerization initiator, it is preferred to use e.g. benzoyl peroxide, lauryl peroxide or di-tertbutyl peroxide[$(CH_3)_3$—C—O—O—C$(CH_3)_3$] which facilitates the graft polymerization.

If the proportion of the above-mentioned monomer mixture to form the matrix, is outside the above-mentioned range, it becomes difficult to control the rubber content in the composition of the present invention, and the impact resistance tends to be poor and the chemical resistance tends to be inferior.

Further, for the preparation of the copolymer (B), it is also possible to employ a method wherein EPDM is dissolved in a predetermined amount of an aromatic vinyl monomer or a mixture thereof with methyl methacrylate, and then emulsified in water. Then, an $\alpha,\beta$-unsaturated nitrile monomer is added and further emulsified, and the latex thereby obtained is subjected to emulsion graft polymerization.

In this case, when the EPDM latex thereby obtained is mixed with the acrylate copolymer latex obtained in the polymerization process for the copolymer (A) and then a necessary amount of the monomer mixture is added, followed by graft polymerization, it is possible to conduct the polymerization and the blending of the copolymers (A) and (B) in a single step. The particle size of the rubber particles in the copolymer (B) is usually from 0.5 to 5 $\mu$m, preferably from 0.6 to 2 $\mu$m. By adjusting the particle sizes of the rubber particles in the copolymers (A) and (B) in the above-mentioned ranges, it is possible to improve the impact resistance of the composition according to the present invention.

The copolymer (C) is obtainable by polymerizing a mixture comprising from 10 to 90% by weight of an aromatic vinyl monomer, from 10 to 40% by weight of an $\alpha,\beta$-unsaturated nitrile monomer and from 0 to 80% by weight of methyl methacrylate, by e.g. mass polymerization, suspension polymerization or mass-suspension polymerization. In this case, it is not desirable to use a crosslinking agent since the crosslinking agent tends to impair the compatibility.

If the composition of the monomer mixture is outside the above range, the compatibility with other copolymers tends to be poor, such being undesirable.

In the composition of the present invention, it is important that the content of the rubber particles, i.e. the total amount of the acrylate copolymer in the copolymer (A) and EPDM in the copolymer (B), constitutes from 5 to 40% by weight of the entire composition. If the rubber content is less than 5% by weight, the impact resistance will be inadequate, and if it exceeds 40% by weight, the amount of the rubber tends to be excessive and the rigidity will be inferior.

Further, it is preferred that from 30 to 97% by weight of the rubber particles contained in the composition of the present invention are constituted by the rubber particles contained in the copolymer (A), i.e. the acrylate copolymer particles. If the proportion is outside this range, the particle size distribution i.e. the proportions of the rubber particles having large and small particle sizes will be improper, and the graft linkage tends to be excessive or inadequate.

The copolymers (A), (B) and (C) may te blended by a usual extruder, etc.

For the preparation of the copolymer (B), it is possible to employ a conjugated diene rubber.

As the conjugated diene rubber, there may be employed, for instance, polybutadiene, cis-1,4-polyisoprene or SBR (i.e. a styrene-butadiene copolymer). In this case, the copolymer (B) is preferably prepared by mass-suspension polymerization. Namely, the conjugated diene rubber is dissolved in a continuous phase-forming monomer mixture, and polymerized in a mass-state until a phase inversion takes place, and then subjected to suspension polymerization with an addition of water. The weight average particle size of the rubber particles is adjusted to fall within a range of from 0.5 to 5 $\mu$m by controlling the degree of stirring. If the particle size of the rubber particles is outside the above range, the impact resistance of the obtained composition tends to be poor. The rubber content of the copolymer (B) is preferably from 5 to 50% by weight, more preferably from 10 to 30% by weight.

The copolymer (C) may be prepared by subjecting the monomer mixture to continuous mass polymerization, suspension polymerization or mass-suspension polymerization. The copolymer (C) is employed (as the case requires, to adjust the content of the total rubber particles in the composition of the present invention).

The content of the total rubber particles in the composition of the present invention is suitably from 5 to 40% by weight. If the content is less than 5% by weight, the impact resistance tends to be inadequate, and if it exceeds 40% by weight, the rigidity tends to be poor. It is preferred that from 60 to 97% by weight, preferably from 75 to 90% by weight, of the total rubber particles are constituted by the above-mentioned acrylate rubber particles. If the acrylate rubber particles are less than 60% by weight, the weather resistance tends to be poor, and if it exceeds 97% by weight, the impact resistance tends to be poor.

The composition of the present invention is usually prepared by kneading the above-mentioned copolymers (A), (B) and, if necessary, (C) to bring the rubber content to the predetermined level, by means of a Bumbury's mixer, an extruder, etc.

The composition of the present invention has superior weather resistance, and, as opposed to the conventional weather resistant rubber-modified resins, the particle size distribution of the rubber particles has a two peak distribution, whereby the impact resistance is also superior.

In the case where a diene rubber is employed, a conjugated diene rubber is preferably employed for the larger size rubber particles, whereby the production is easy, and since the larger size rubber particles have a less surface area, there will be no substantial degradation due to the ultra-violet rays or oxygen and thus the weather resistance is good.

Now, the present invention will be described in further detail with reference to Examples and Comparative Examples. However, it should be understood that the present invention is by no means restricted by these specific Examples.

PREPARATION 1: PREPARATION OF ACRYLATE COPOLYMERS (ACRYLATE RUBBER LATEXES)

Preparation 1—1

Into a 3 liter glass flask, 1520 g of deionized water (hereinafter referred to simply as "water"), 20 g of higher fatty acid soaps (sodium salts of fatty acids composed mainly of a fatty acid of 18 carbon atoms) and 10 g of sodium hydrogencarbonate, were fed and heated to 75° C. under a nitrogen stream. Then, 20 ml of an aqueous solution containing 0.75 g of potassium persulfate was added. Five minutes later, 40 g of a monomer mixture out of the total mixture comprising 937.5 g of butyl acrylate (BA), 62.5 g of acrylonitrile (AN) and 5 g of allyl methacrylate (AMA), was fed. In a few minutes, heat generation started, and the initiation of the polymerization was confirmed. After 15 minutes from the initial introduction of the monomer mixture, 20 ml of an aqueous solution containing 0.75 g of potassium persulfate was further added, and at the same time, the continuous addition of the rest of the monomer mixture was started. The addition was completed after 2 hours and 30 minutes. However, at an intermediate point i.e. after 1 hour and 30 minutes, 20 ml of an aqueous solution containing 6 g of fatty acid soaps, was added. After the completion of the addition of the monomer mixture, the polymerization was continued for further 1 hour at the same temperature. The conversion was 98%, and the particle size was 0.08 μm.

A half amount of this latex was put into a 3 liter flask, and mixed with 685 ml of water and 5 g of an aqueous solution containing 10% of sodium dodecylbenzene sulfonate (DBS). The mixture was held at 50° C. While gently stirring the mixture, 320 g of a 2.5% phosphoric acid aqueous solution was added in about 1 minute, and then the mixture was left to stand for 2 minutes. Then, 22.4 g of a 25% potassium hydroxide aqueous solution and 14 g of a 25% DBS aqueous solution were added, and the mixture was thoroughly stirred. Thus, an acrylate rubber latex having a particle size of 0.23 μm (as measured by Nanosizer) was obtained.

Preparation 1–2

A rubber latex having a particle size of 0.24 μm was obtained in the same manner as in Preparation 1—1 except that a monomer mixture comprising 900 g of BA, 100 g of styrene (St) and 5 g of AMA, was used.

Preparation 1–3

A rubber latex having a particle size of 0.25 μm was obtained in the same manner as in Preparation 1—1 except that a monomer mixture comprising 900 g of BA, 100 g of methyl metahcrylate (MMA) and 5 g of AMA, was used.

Preparation 1–4

0.5 g of lauroyl peroxide and 4 g of an emulsifier (polyoxyethylenealkylphenylether sulfate, Hitenol N-07 manufactured by Daiichi Kogyo Seiyaku K.K.) were dissolved in a monomer mixture comprising 95 g of BA, 5 g of AN and 1 g of trimethylol propane triacrylate (TMPT). Separately, 300 g of water was put into a 1 liter flask, and the monomer mixture solution was gradually added and emulsified under stirring by means of a desk-top-type homomixer to obtain a uniform emulsion. The flask was set up for polymerization, and the temperature was raised to 60° C. under a nitrogen stream, whereupon the polymerization started. Two hours later, the addition of a monomer mixture comprising 95 g of BA, 5 g of AN and 1 g of TMPT, was started. Four hours later, the addition was completed, but the polymerization was continued for further one hour at the same temperature. The conversion was 96%. A crosslinked rubber latex having an average particle size of 0.24 μm was obtained.

Preparation 1–5

2116 g (450 g as rubber) of the rubber latex obtained in Preparation 1—1, was put into a 2 liter flask, and heated to 80° C. under a nitrogen stream. A mixture comprising 45 g of BA, 5 g of AN and 1.25 g of TMPT was continuously fed in about 15 minutes. However, prior to the feeding, 15 ml of an aqueous solution containing 0.5 g of potassium persulfate was added. During this period, the pH of the system was maintained at about 7.5.

PREPARATION 2: PREPARATION OF COPOLYMERS (A)

Preparation 2-1

2358 g (500 g as rubber) of the acrylate rubber latex obtained in Preparation 1—1, was put into a 3 liter flask equipped with a stirrer and a reflux condenser, and heated to a temperature of 80° C. 50 ml of an aqueous solution containing 1.86 g of potassium persulfate was added, and at the same time, the continuous addition of a monomer mixture comprising 650 g of St and 278.6 g of AN, was started. Fifteen minutes later, the continuous addition of 147 ml of an aqueous solution containing 5.57 g of potassium persulfate was also started. After 30 minutes, 1 hour and 10 minutes and 2 hours from the initiation of the addition of the monomer mixture, 16.3 g of a 25% potassium hydroxide aqueous solution, 35 ml of an aqueous solution containing 4.29 g of higher fatty acid soaps and 35 ml of the same aqueous solution of soaps and 5.57 g of terpinolene, were added, repectively. The continuous addition of the monomer mixture and the aqueous potassium persulfate solution was completed in 3 hours and 45 minutes, and the reaction system was left to stand at the same temperature for further 30 minutes to complete the polymerization. After introducing the latex into a great amount of an aqueous calcium chloride solution, the graft polymer thus obtained was collected by filtration and dried.

The conversion by the polymerization was 98.5%.

Preparation 2—2

The acrylate rubber latex (500 g as rubber) obtained in Preparation 1-5 was graft-polymerized in the same manner as in Preparation 2-1.

The conversion by the polymerization was 96.5%.

PREPARATION 3: PREPARATION OF COPOLYMERS (B)

Preparation 3-1

Into a 2 liter autoclave equipped with an anchor-type stirrer, 552 g of St, 140 g of EPDM [Mooney viscosity $ML_{1+4}(100°$ C.) 45; iodine value: 25; ethylidene norbornene as the third component] and 100 g of n-heptane, were fed, and after flushing with nitrogen, stirred at 50° C. for 2 hours at 100 rpm and completely dissolved. Then, while stirring the solution under the same condition, 258 g of AN was fed at a rate of 40 g/10 min. Then, 0.5 g of ditert-butylperoxide, 0.13 g of tert-butylperacetate and 0.5 g of terpinolene were fed. The mass polymerization was conducted at 97° C. for 7 hours and 20 minutes.

About 30 minutes before the completion of the mass polymerization, 1.5 g of di-tert-butylperoxide and 1.5 g of terpinolene dissolved in 50 g of St, were fed. The particle size of the EPDM rubber at the completion of the polymerization, was 1.6 $\mu$m.

The syrup obtained in the above mass polymerization process, was fed into a 3 liter autoclave (equipped with a Pfaudler-type stirrer with three vanes) containing an aqueous solution of 2.5 g of a suspending agent (an acrylic acid- acrylate copolymer) in 1100 g of water: After flushing with nitrogen, this aqueous suspension system was subjected to suspension polymerization at 130° C. for 2 hours under a condition of 500 rpm. Then, the temperature was raised to 150° C., and the stripping was conducted for 1 hour. The resin composition thereby obtained, was washed with water and dried at 100° C., whereby 920 g of a graft copolymer resin was obtained.

Preparation 3-2

A graft copolymer resin was obtained in the same manner as in Preparation 3-1 except that 140 g of EPDM, 380 g of St, 100 g of n-heptane, 215 g of AN and 215 g of MMA were used, and the total amounts of A1 and MMA were introduced later. The particle size of the rubber was 1.8 $\mu$m.

Preparation 3—3

Into a 2 liter autoclave equipped with an anchor-type stirrer, 520 g of St, 130 g of EPDM, 9.75 g of an oil-soluble emulsifier (polyoxyethylenealkylphenylether sulfate, Hitenol N-08 manufactured by Daiichi Kogyo Seiyaku K.K.) and 32.5 ml of water, were fed. The mixture was stirred at 55° C. for 3 hours in a nitrogen atmosphere and uniformly dissolved. Then, 163 ml of water was added in a few minutes under stirring, and then, 585 ml of water was added at once for phase inversion. The particle size of the rubber component of the emulsion obtained by the phase inversion, was 0.82 $\mu$m (as measured by Coaltar Counter). Separately, an emulsion comprising 77.1 g of AN, 0.75 g of TMPT, 1.17 g of sodium dodecylbenzene sulfonate and 91.4 g of water, was prepared, and mixed with 500.9 g of the above-mentioned emulsion, whereby an emulsion of St-AN-EPDM was obtained.

1110.6 g (255 g as rubber) of the acrylate rubber latex obtained in Preparation 1-5 was fed into a 3 liter flask, and heated to 80° C. Then, at the same time as the addition of 25 ml of an aqueous solution containing 1 g of potassium persulfate, the continuous feeding of 671.3 g of the above-mentioned St-AN-EPDM emulsion and 84 ml of an aqueous solution containing 3.34 g of potassium persulfate, was started. The feeding of the emulsion was completed in 1 hour and 20 minutes. Then, the continuos feeding of 300 g of monomers (St: 210 g, AN: 90 g) was started, whereby the monomers were fed at a constant rate for 2 hours. After 30 minutes, 1 hour and 15 minutes and 2 hours from the initiation of the polymerization, 7.5 g of a 25% potassium hydroxide aqueous solution, 20 ml of an aqueous solution containing 2.57 g of higher fatty acid soaps and 20 ml of the same aqueous solution of soaps (2.57 g) and 3.34 g of terpinolene, were added, respectively. After the completion of the feeding of the monomers, the system was kept at the same temperature for 30 minutes to complete the polymerization. The conversion was 98%. The copolymer latex was introduced into a great amount of water containing calcium chloride, then washed with water and dried to obtain 829.5 g of a graft copolymer.

Preparation 3-4

833.7 g of a graft copolymer was obtained at a conversion of 97% in the same manner as in Preparation 3—3 except that 1208.6 g (277.5 g as rubber) of the acrylate rubber latex obtained in Preparation 1-5, 335.6 g of the St-AN-EPDM emulsion and 428.5 g of monomers (St: 300 g, AN: 128.5 g) were used.

EXAMPLE 1

485.7 g of the graft copolymer (A) obtained in Preparation 2-1, 214.3 g of the graft copolymer (B) obtained in Preparation 3-1 and 300.0 g of a copolymer (C) (an AS resin composed of 70% by weight of St and 30% by weight of AN) were kneaded together with 3 g of DTBPC as an antioxidant and 5 g of magnesium stearate (Mg-Stearate) as a lubricant by a Bumbury's mixer, pelletized and then molded by 7-OZ injection molding machine at a cylinder temperature of 220° C. and at a die temperature of 40° C. to obtain test pieces.

The test pieces were tested for the impact strength, tensile strength and weather resistance in accordance with the following methods.

Impact strength: (Notched; Izod; 23° C./−20° C.) ASTM D-256-54T

Tensile strength: (23° C.) ASTM D-638-61T

Weathering test: Tensile elongation maintaining rate (200 hrs/400 hrs) as measured by Sunshine-Weathe-

EXAMPLE 2

| | |
|---|---|
| Graft copolymer (A) obtained in Preparation 2-1 | 485.7 g |
| Graft copolymer (B) obtained in Preparation 3-2 | 214.3 g |
| Copolymer (C) (same as in Example 1) | 300.0 g |
| DTBPC/Mg-Stearate | 3/5 g |

The above composition was blended and molded in the same manner as in Example 1 to obtain test pieces. The test pieces were tested in the same manner as in Example 1.
The results are shown in Table 1.

EXAMPLE 3

| | |
|---|---|
| Graft copolymer (A) obtained in Preparation 2-1 by using the rubber latex of Preparation 1-2 | 485.7 g |
| Graft copolymer (B) obtained in Preparation 3-1 | 214.3 g |
| Copolymer (C) (same as in Example 1) | 300.0 g |
| DTBPC/Mg-Stearate | 3/5 g |

The above composition was blended and molded in the same manner as in Example 1 to obtain test pieces. The test pieces were tested in the same manner as in Example 1.
The results are shown in Table 1.

EXAMPLE 4

| | |
|---|---|
| Graft copolymer (A) obtained in Preparation 2-1 by using the rubber latex of Preparation 1-3 | 485.7 g |
| Graft copolymer (B) obtained in Preparation 3-1 | 214.3 g |
| Copolymer (C) (same as in Example 1) | 300.0 g |
| DTBPC/Mg-Stearate | 3/5 g |

The above composition was blended and molded in the same manner as in Example 1 to obtain test pieces. The test pieces were tested in the same manner as in Example 1.
The results are shown in Table 1.

EXAMPLE 5

| | |
|---|---|
| Graft copolymer (A) obtained in Preparation 2-1 by using the rubber latex of Preparation 1-5 | 485.7 g |
| Graft copolymer (B) obtained in Preparation 3-1 | 214.3 g |
| Copolymer (C) (same as in Example 1) | 300.0 g |
| DTBPC/Mg-Stearate | 3/5 g |

The above composition was blended and molded in the same manner as in Example 1 to obtain test pieces. The test piece were tested in the same manner as in Example 1.
The results are shown in Table 1.

EXAMPLE 6

| | |
|---|---|
| Graft copolymer obtained in Preparation 3-3 | 414.0 g |
| Copolymer (C) (same as in Example 1) | 586.0 g |
| DTBPC/Mg-Stearate | 3/5 g |

The above composition was blended and molded in the same manner as in Example 1 to obtain test pieces. The test pieces were tested in the same manner as in Example 1.
The results are shown in Table 1.

COMPARATIVE EXAMPLE 1

| | |
|---|---|
| Graft copolymer (A) obtained in Preparation 2-1 | 571.4 g |
| Copolymer (C) (same as in Example 1) | 428.6 g |
| DTBPC/Mg-Stearate | 3/5 g |

The above composition was blended and molded in the same manner as in Example 1 to obtain test pieces. The test pieces were tested in the same manner as in Example 1.
The results are shown in Table 1.

COMPARATIVE EXAMPLE 2

| | |
|---|---|
| Graft copolymer (B) obtained in Preparation 3-1 | 1000 g |
| DTBPC/Mg-Stearate | 3/5 g |

The above composition was blended and molded in the same manner as in Example 1 to obtain test pieces. The test pieces were tested in the same manner as in Example 1.
The results are shown in Table 1.

COMPARATIVE EXAMPLE 3

| | |
|---|---|
| Graft copolymer obtained in the same manner as Preparation 2-1 by using a latex obtained by polymerizing only butyl acrylate in the same manner as in Preparation 1-1 | 486.7 g |
| Copolymer (B) obtained in Preparation 3-1 | 214.3 g |
| DTBPC/Mg-Stearate | 3/5 g |

The above composition was blended and molded in the same manner as in Example 1 to obtain test pieces. The test pieces were tested in the same manner as in Example 1.
The results are shown in Table 1.

TABLE 1

| | Examples | | | | | | Comparative Examples | | |
|---|---|---|---|---|---|---|---|---|---|
| | 1 | 2 | 3 | 4 | 5 | 6 | 1 | 2 | 3 |
| Rubber-particles Large/Small | EP/AR | EP/AR | EP/AR | EP/AR | EP/AR | EP/AR | —/AR | EP/— | EP/AR |
| Acrylate rubber component | BA—AN | BA—AN | BA—AN | BA—St | BA—MMA | BA—AN | BA—AN | — | BA |
| Izod, 23° C. kg cm/cm | 25 | 21 | 18 | 20 | 24 | 28 | 4 | 5 | 9 |

TABLE 1-continued

| | Examples | | | | | | Comparative Examples | | |
|---|---|---|---|---|---|---|---|---|---|
| | 1 | 2 | 3 | 4 | 5 | 6 | 1 | 2 | 3 |
| Tensile strength kg/cm$^2$ | 420 | 390 | 430 | 420 | 370 | 410 | 430 | 360 | 410 |
| Weatherability | 100/50 | → | → | → | → | 100/45 | 100/50 | 90/40 | 100/50 |

Notes:
EP: EPDM (EP rubber), AR: acrylate rubber, BA: butylacrylate, AN: acrylonitrile, St: styrene

PREPARATION 4: PREPARATION OF GRAFT COPOLYMER (A)

Into a 3 liter glass flask, 1520 g of water, 20 g of higher fatty acid soaps (sodium salts of fatty acids composed mainly of a fatty acid of 18 carbon atoms) and 10 g of sodium hydrogencarbonate, were fed, and heated to 75° C. under a nitrogen stream. Then, 20 ml of an aqueous solution containing 0.75 g of potassium sulfate (KPS) was added. Five minutes later, 40 g of a monomer mixture out of the total mixture comprising 937.5 g of butyl acrylate (BA), 6.25 g of acrylonitrile (AN) and 5 g of allyl methacrylate (AMA), was fed. In a few minutes, heat generation started, and the initiation of the polymerization was confirmed. After 15 minutes from the initial introduction of the monomer mixture, 20 ml of an aqueous solution containing 0.75 g of KPS was further added, and at the same time, the continuous addition of the rest of the monomer mixture was started. The addition was completed after 2 hours and 30 minutes. However, at an intermediate point i.e. after 1 hour and 30 minutes, 20 ml of an aqueous solution containing 6 g of fatty acid soaps, was added. After the completion of the addition of the monomer mixture, the polymerization was continued for further 1 hour at the same temperature. The conversion was 98.5%, and the particle size was 0.08 μm.

A half amount of this latex was put into a 3 liter flask, and mixed with 685 ml of water and 5 g of an aqueous solution containing 10% of sodium dodecyl benzenesulfonate (BBS). The mixture was held at 50° C. While gently stirring the mixture, 320 g of a 2.5% phosphoric acid aqueous solution was added in about 1 minute, and then the mixture was left to stand for 2 minutes. Then, 22.4 g of a 25% potassium hydroxide aqueous solution and 14 g of a 25% DBS aqueous solution were added, and the mixture was thoroughly stirred. Thus, an acrylate rubber latex having a particle size of 0.23 μm (as measured by Nanosizer) was obtained 2358 g (500 g as solid content) of the above acrylate rubber latex (0.23 μm) was put into a 3 liter flask equipped with a stirrer and a reflux condenser and heated to a temperature of 80° C. 50 ml of an aqueous solution containing 1.86 g of KPS was added, and at the same time, the continuous addition of a monomer mixture comprising 650 g of styrene (St) and 278.6 g of AN, was started. Fifteen minutes later, the continuous feeding of 147 ml of an aqueous solution containing 5.57 g of KPS, was also started. After 30 minutes, 1 hour and 10 minutes and 2 hours from the initiation of the addition of the monomer mixture, 16.3 g of a 25% potassium hydroxide aqueous solution, 35 ml of an aqueous solution containing 4.29 g of higher fatty acid soaps and 35 ml of the same aqueous solution of soaps (4.29 g) and 5.57 g of terpinolene, were added, respectively. The continuous addition of the monomer mixture and the aqueous KPS solution was completed 3 hours and 45 minutes later. Then, the system was left to stand at the same temperature for further 30 minutes to complete the polymerization.

The latex was introduced into a great amount of an aqueous magnesium sulfate solution, and the graft copolymer was collected by filtration, washed with water and then dried. The conversion by the graft polymerization was about 98.5%.

PREPARATION 5: PREPARATION OF GRAFT COPOLYMER (B)

In a 2 liter autoclave equipped with an anchor-type stirrer, 150 g of butadiene rubber (Diene NF-35 manufactured by Asahi Chemical Industry Co., Ltd.) was dissolved in a mixture comprising 250 g of AN and 600 g of St. Then, 0.13 g of tert-butylperacetate, 0.5 g of di-tert-butylperoxide and 0.7 g of a stabilizer mixture, were added thereto. The mixture was heated to 100° C. in a nitrogen atmosphere, and polymerized under stirring at 100 rpm. During this period, about 1 g/hr of terpinolene was added over a period of 5 hours and finally 5 g thereof was added. When the conversion of the monomers reached about 30%, the polymerization mixture (syrup) was transferred to a 3 liter autoclave (equiped with a Pfaudler-type stirrer having three vanes) containing an aqueous solution of 3 g of a suspending agent (an acrylic acid-acrylate copolymer) in 1200 g of water. After flushing with nitrogen, the suspension system was subjected to polymerization at 130° C. for 2 hours under the condition of 500 rpm, and then the stripping was conducted at 150° C. for 1 hour. The resin composition thus obtained, was washed with water and dried to obtain about 990 g of a graft copolymer. The rubber particles in the graft copolymer had a particle size of about 1.2 μm.

EXAMPLE 7: Preparation of resin composition 486 g of the graft copolymer (A) obtained in Preparation 4, 200 g of the graft copolymer (B) obtained in Preparation 5 and 314 g of a copolymer (C) (an AS resin composed of 74% by weight of St and 26% by weight of AN), were kneaded together with 3 g of DTBPC as an antioxidant, 5 g of magnesium stearate (Mg-Stearate) as an lubricant and 3 g of a ultra violet absorber (Chinupin-P manufactured by Ciba-Geigy Corp.) by a Bumbury's mixer, pelletized and then molded by 7-OZ injection molding machine at a cylinder temperature of 220° C. and a die temperature of 40° C. into test pieces.

Evaluation

The test pieces were tested for the falling dart impact strength (FDI) and the tensile strength. The weatherability was determined by measuring, in the same manner, the physical properties of the exposed samples by a sunshine weatherometer (WE-SON-HC manufactured by Toyo Rika K.K.) or outdoor exposure (at an angle of 45° C. on the south side). The test methods were as follows.

FDI: An impact tester manufactured by ETI Co. in U.S.A. was employed (at 23° C.)

Test pieces: Flat plates having a thickness of 3 mm

Tensile strength and elongation: ASTM D-638-61T (at 23° C.)

The results are shown in Tables 2 and 3. In Table 3, the initial energy is an energy required until the maximum repulsion force was exerted to the dart, and the total energy is an energy required until the dart penetrated through the test piece.

EXAMPLE 8

The same copolymers (A) to (C) as used in Example 7 were blended in the following ratio to obtain test pieces.

Graft copolymer (A): 400 g
Graft copolymer (B): 400 g
Copolymer (C): 200 g

The test pieces were tested in the same manner as in Example 7. The results are shown in Table 2.

PREPARATION 6: PREPARATION OF GRAFT COPOLYMER CONTAINING EPDM

Into a 2 liter autoclave equipped with an anchor-type stirrer, 552 g of St, 140 g of EPDM [Mooney viscosity $ML_{1+4}$ (100° C.): 45; iodine value: 25; ethylidene norbornene as the third component] and 100 g of n-heptane, were fed, and after flushing with nitrogen, stirred at 50° C. for 2 hours at 100 rpm and completely dissolved. Then, while stirring the solution under the same condition, 258 g of AN was fed at a rate of 40 g/10 min. Then, 0.5 g of di-tert-butylperoxide, 0.13 g of tert-butylperacetate and 0.5 g of terpinolene were fed, and the mass polymerization was conducted at 97° C. for 7 hours and 20 minutes. About 30 minutes before the completion of the mass polymerization, 1.5 g of di-tert-butylperoxide and 1.5 g of terpinolene dissolved in 50 g of St, were fed. The particle size of the EPDM rubber at the completion of the polymerization, was 1.6 μm.

The syrup obtained in the mass polymerization process, was fed into a 3 liter autoclave (equipped with a Pfaudler-type stirrer having three vanes) containing an aqueous solution of 2.5 g of a suspending agent (same as in Example 1) in 1100 g of water. After flushing with nitrogen, the aqueous suspension system was subjected to suspension polymerization at 130° C. for 2 hours under a condition of 500 rpm. Then, the temperature was raised to 150° C., and the stripping was conducted for 1 hour. The resin composition thus obtained, was washed with water and then dried at 100° C., whereby 920 g of a graft copolymer resin was obtained.

PREPARATION OF A RESIN COMPOSITION AND EVALUATION

Same graft copolymer (A) as in Example 7: 486 g
The above EPDM-based graft copolymer: 214 g
Same copolymer (C) as in Example 7: 300 g The above composition was blended and molded in the same manner as in Example 7 to obtain test pieces. The test pieces were tested in the same manner as in Example 7. The results are shown in Tables 2 and 3.

COMPARATIVE EXAMPLE 4: PREPARATION OF GRAFT COPOLYMER CONTAINING SBR 2400 g (500 g as rubber) of a SBR (butadiene-/styrene=90/10) latex having a particle size of 0.25 μm, was fed into a 3 liter flask equipped with a stirrer and a reflux condenser, and heated to a tempeature of 80° C. Then, 50 ml of an aqueous solution containing 1.86 g of KPS was added, and at the same time, the continuous addition of a monomer mixture comprising 525 g of St and 225 g of AN, was started. Fifteen minutes later, the continuous feeding of 140 ml of an aqueous solution containing 5.57 g of KPS was also started. After 30 minutes from the initiation of the addition of the monomer mixture, 15 g of a 25% potassium hydroxide aqueous solution and 3.75 g of terpinolene were added, and after 1 hour and 1 hour and 40 minutes from the initiation of the addition of the monomer mixture, 30 ml of an aqueous solution containing 3.75 g of higher fatty acid soaps was added.

The continuous feeding of the monomer mixture was completed in 3 hours, and the continuous feeding of the aqueous KPS solutuion was completed in 3 hours and 15 minutes. Then, the system was maintained at the same temperature for further 30 minutes i.e. until 3 hours and 45 minutes, to increase the conversion of the polymerization.

The graft copolymer latex thus obtained was subjected to the same treatment as in the case of the acrylate rubber-based graft copolymer of Example 7, dried and then subjected to the tests.

PREPARATION OF A RESIN COMPOSITION AND EVALUATION

The above SBR-based graft copolymer: 425 g
Same graft copolymer (B) as in Example 7: 200 g
Same copolymer (C) as in Example 7: 375 g The above composition was blended and molded in the same manner as in Example 7 to obtain test pieces. The test pieces were tested in the same manner as in Example 7. The results are shown in Tables 2 and 3.

TABLE 2

| | Exposure test by sunshine weatherometer (Tensile elongation %/Tensile strength kg/cm²) | | | |
|---|---|---|---|---|
| Exposure time | Example 7 | Example 8 | Comparative Example 4 | Preparation 6 |
| 0 hr | 20/400 | 35/390 | 55/410 | 26/395 |
| 100 | 34/390 | 20/390 | 3/415 | 14/395 |
| 200 | 16/380 | 15/395 | 2/405 | 10/390 |
| 400 | 17/420 | 13/400 | 4/410 | 9/385 |

TABLE 3

| | Outdoor weathering test (Initial value/value after one month) | | |
|---|---|---|---|
| | Example 7 | Comparative Example 4 | Preparation 6 |
| Maximum strength (K. newton) | 2.4/2.4 | 2.6/1.2 | 2.4/2.4 |
| Initial energy (Joule) | 27/16 | 14/5 | 15/15 |
| Total energy (Joule) | 24/23 | 25/12 | 24/20 |
| Exposure period (from/to) | July 20/ Aug. 10 | May 23/ June 23 | July 10/ Aug. 10 |

EXAMPLE 9: PREPARATION OF ACRYLATE RUBBER LATEX

Into a 3 liter glass flask, 1520 g of water, 20 g of higher fatty acid soaps (sodium salts of fatty acids composed mainly of a fatty acid of 18 carbon atoms) and 10 g of sodium hydrogencarbonate, were fed, and heated to a temperature of 75° C. under a nitrogen stream. Then, 20 ml of an aqueous solution containing 0.75 g of potassium persulfate was added. Five minutes later, 40 g of a monomer mixture out of the mixture comprising 937.5 g of butyl acrylate (BA), 62.5 g of acrylonitrile (AN) and 5 g of allyl methacrylate (AMA), was fed. In about a few minutes, heat generation started, and the initiation of the polymerization was confirmed. After 15 minutes from the initial introduction of the monomer mixture, 20 ml of an aqueous solution containing 0.75 g of potassium persulfate was further added, and at the same time, the continuous addition of the rest of the monomer mixture was started. The addition was completed after 2 hours and 30 minutes. However, at an intermediate point, i.e. after 1 hour and 30 minutes, 20 ml of an aqueous solution containing 6 g of fatty acid soaps, was added. After the completion of the addition of the monomer mixture, the polymerization was continued for further 1 hour at the same temperature. The conversion was 98%, and the particle size was 0.08 μm.

A half amount of this latex was put into a 3 liter flask, and mixed with 685 ml of water and 5 g of an aqueous solution containing 10% of sodium dodecyl benzene sulfonate (DBS). Then, the mixture was held at 50° C. While gently stirring the mixture, 320 g of a 2.5% phosphoric acid aqueous solution was added in about 1 hour. The mixture was left to stand for a while, and then 22.4 g of a 25% potassium hydroxide aqueous solution and 14 g of a 25% DBS aqueous solution were added and stirred thoroughly, whereby an acrylate rubber latex having an average particle size of 0.23 μm (as measured by Nanosizer) was obtained.

GRAFT POLYMERIZATION 2358 g (500 g as solid content) of the above rubber latex was put into a 3 liter flask equipped with a stirrer and a reflux condenser, and heated to a temperature of 80° C. Then, 25 ml of an aqueous solution containing 1.0 g of potassium persulfate was added, and at the same time the continuous addition of a monomer mixture comprising 350 g of styrene (St) and 150 g of acrylonitrile (AN), was started (then, the monomer mixture was constantly fed over a period of 2 hours and 30 minutes). Fifteen minutes later, the continuous addition of 75 ml of an aqueous solution containing 3.0 g of potassium persulfate, was also starter. After 1 hour and 30 minutes from the initiation of the addition of the monomer mixture (by that time, 250 g of the monomers were polymerized), 5.0 g of terpinolene was added. The polymerization was continued and the addition of the total amount of the monomers and the total amount of the initiator was completed in 2 hours and 30 minutes. The polymerization was continued at the same temperature for further 30 minutes to complete the polymerization. During the polymerization, 13 g of a 25% potassium hydroxide aqueous solution, 30 ml of an aqueous solution containing 3.5 g of fatty acid soaps and 30 ml of the same aqueous solution of soaps (3.5 g) were added after 30 minutes, 1 hour and 2 hours, respectively. A graft latex was obtained at a conversion of 98%.

This latex was introduced in a great amount of water containing magnesium sulfate, washed with water and then dried to obtain 985 g of a graft copolymer.

EVALUATION OF THE PHYSICAL PROPERTIES

The graft copolymer thus obtained, was blended with an EPDM-containing graft copolymer (weight average rubber particle size: 1.6 μm) prepared as described below to obtain a composition having a weight ratio of the acrylate rubber to EPDM of 85/15. This composition was further blended with an AS resin to obtain a composition having a rubber content of 20% by weight. Test pieces were prepared from the composition thus obtained, by injection molding, and tested for various physical properties. The results are shown in Table 4.

PREPARATION OF EPDM-CONTAINING GRAFT COPOLYMER

Into a 2 liter autoclave equipped with an anchor-type stirrer, 552 g of St, 140 g of EPDM [Mooney viscosity $ML_{1+4}$ (100° C.): 45; iodine value: 25; ethylidene norbornene as the third component] and 100 g of n-heptane were fed, and after flushing with nitrogen, stirred at 50° C. for 2 hours at 100 rpm and completely dissolved. Then, while stirring the solution under the same condition, 258 g of AN was fed at a rate of 40 g/10 min. Then, 0.5 g of di-tert-butylperoxide, 0.13 g of tertbutylperacetate and 0.5 g of terpinolene were fed, and the mass polymerization was conducted at 97° C. for 7 hours and 20 minutes. About 30 minutes before the completion of the mass polymerization, 1.5 g of di-tert-butyl peroxide and 1.5 g of terpinolene dissolved in 50 g of St, were fed. The particle size of EPDM at the completion of the polymerization, was 1.6 μm.

The syrup obtained in the above mass polymeriation process, was fed into a 3 liter autoclave (equipped with a Pfaudler-type stirrer having three vanes) containing an aqueous solution of 2.5 g of a suspending agent (an acrylic acid-acrylate copolymer) in 1100 g of water. After flushing with nitrogen, the aqueous suspension system was subjected to suspension polymerization at 130° C. for 2 hours under a condition of 500 rpm. Then, the temperature was raised to 150° C., and the stripping was conducted for 1 hour. The resin composition thus obtained, was washed with water and then dried at 100° C. to obtain 920 g of a graft copolymer resin.

EXAMPLE 10

To 2358 g (500 g as solid content) of the same acrylate rubber latex as in Example 9, 40 ml of an aqueous solution containing 1.5 g of potassium persulfate was added at 80° C., and at the same time, the continuous addition of a mixture comprising 525 g of St and 225 g of AN, was started (then the mixture was constantly fed over a period of 3 hours). Fifteen minutes later, the continuous addition of 120 ml of an aqueous solution containing 4.5 g of potassium persulfate, was started. After 1 hour and 50 minutes from the initiation of the addition of the monomer mixture (by that time, 380 g of monomers were polymerized), 7.5 g of terpinolene was added, and the polymerization was further continued. The addition of the total amount of the monomer mixture was completed in 3 hours, and the addition of the total amount of the initiator was completed in 3 hours and 10 minutes. The system was left at the same temperature for further 20 minutes to complete the polymerization. During the polymerization, 14 g of a 25% potasssium hydroxide aqueous solution, 30 ml of an aqueous solution containing 3.5 g of higher fatty acid soaps and 35 ml of the same aqueous solution cf soaps (4 g), were added after 30 minutes, 1 hour and 10 minutes and 2 hours, respectively. A graft latex was obtained at a conversion of 97%. It was subjected to salting out with magnesium sulfate, and 1220 g of a dried graft copolymer was obtained. The physical properties were measured in the same manner as in Example 9. The results thereby obtained are shown in Table 4.

EXAMPLE 11

To 2358 g (500 g as solid content) of the same acrylate rubber latex as in Example 9, 50 ml of an aqueous solution containing 2 g of potassium persulfate was added at 80° C., and at the same time the continuous addition of a mixture comprising 700 g of St and 300 g of AN was started (then the mixture was constantly fed over a period of 3 hour and 30 minutes). Fifteen minutes later, continuous addition of 150 ml of an aqueous solution containing 6 g of potassium persulfate, was also started. After 1 hour and 45 minutes from the initiation of the addition of the monomer mixture (by that time, 450 g of the monomers were polymerized), 10 g of terpinolene was added, and the polymerization was further continued. The addition of the total amounts of the monomer mixture and the initiator was completed in 3 hours and 30 minutes. The polymerization was continued for further 30 minutes. During the polymerization, 16 g of a 25% potassium hydroxide aqueous solution, 40 ml of an aqueous solution containing 4.5 g of fatty acid soaps and 45 ml of the same aqueous solution of soaps (5 g), were added after 30 minutes, 1 hour and 20 minutes and 2 hours and 20 minutes, respectively. From the treatment with magnesium sulfate, 1450 g of a dried graft copolymer was obtained. The physical properties were measured in the same manner as in Example 9. The results are shown in Table 4.

EXAMPLE 12

1222 g of a graft copolymer was obtained in the same manner as in Example 10 except that 3.75 g of thioglycolic acid was employed as the chain transfer agent. The physical properties were measured in the same manner as in Example 9. The results are shown in Table 4.

COMPARATIVE EXAMPLE 5

1210 g of a graft copolymer was obtained in the same manner as in Example 10 except that terpinolene was added at the initiation of the continuous addition of the monomer mixture.

COMPARATIVE EXAMPLE 6

1215 g of a graft copolymer was obtained in the same manner as in Example 10 except that terpinolene was added after 1 hour from the initiation of the polymerization (by that time, 180 g of the monomers were polymerized).

COMPARATIVE EXAMPLE 7

1455 g of a graft copolymer was obtained in the same manner as in Example 11 except that terpinolene was added after 2 hours and 45 minutes from the initiation of the polymerization (by that time, 660 g of the monomers were polymerized).

The physical properties of the copolymers obtained by the respective Comparative Examples were measured in the same manner as in Example 9. The results are shown in Table 4.

TABLE 4

| | Examples | | | | Comparative Examples | | |
|---|---|---|---|---|---|---|---|
| | 9 | 10 | 11 | 12 | 5 | 6 | 7 |
| Izod impact strength (unit: Kg cm/cm) JIS K6871 | 28 | 24 | 22 | 20 | 4 | 18 | 13 |
| Melt-flow (condition: 10 Kg/220° C.) (unit: g/10 min) JIS K6871 | 13 | 14 | 14 | 13 | 6 | 11 | 8 |
| Gloss (unit: %) JIS K7105 | 72 | 80 | 85 | 76 | 34 | 50 | 88 |

I claim:

1. A process for preparing a weather and impact resistant resin composition, which comprises
   (a) copolymerizing
      from 100 to 60% by weight of an alkyl acrylate having an alkyl group of from 2 to 12 carbon atoms,
      from 0 to 40% by weight of a vinyl monomer copolymerizable with the alkyl acrylate, and
      from 0 to 5% by weight of a multifunctional vinyl monomer
   to obtain an acylate rubber latex having a weight average particle size of from 0.1 to 0.45 $\mu$m;
   (b) polymerizing
      from 100 to 300 parts by weight, relative to 100 parts by weight of the solid content in said acrylate rubber latex, of a monomer mixture comprising
      from 10 to 90% by weight of an aromatic vinyl monomer,
      from 10 to 40% by weight of an $\alpha,\beta$-unsaturated nitrile monomer, and
      from 0 to 80% by weight of methyl methacrylate,
   in the presence of aid acrylate rubber latex to obtain a graft copolymer (A), wherein no chain transfer agent is added at the initial stage of the polymerization, and from 0.5 to 3 parts by weight of a chain transfer agent is added when not more than 70% by weight and from 50 to 100 parts by weight of the monomer mixture has been polymerized; and then
   (c) blending the graft copolymer (a) with a graft copolymer (B) composed of a continuous phase comprising
      from 10 to 90% by weight of residues of an aromatic vinyl monomer,
      from 10 to 40% by weight of residues of an $\alpha,\beta$-unsaturated nitrile monomer, and
      from 0 to 80% by weight of residues of methyl methacrylate, and
   particles of a rubber having a weight average particle size of from 0.5 to 5 $\mu$m dispersed in the continuous phase, and a copolymer (C) comprising
      from 10 to 90% by weight of residues of an aromatic vinyl monomer,
      from 10 to 40% by weight of residues of an $\alpha,\beta$-unsaturated nitrile monomer and
      from 0 to 80% by weight of residues of methyl methacrylate,
   to bring the content of the total rubber particles to a level of from 5 to 40% by weight of the composition.

2. The process according to claim 1, wherein the rubber particles in the graft copolymer (B) are particles of an ethylene-propylene-non-conjugated diene rubber.

3. The process according to claim 2, wherein the particles of the acrylate rubber in the graft copolymer (A) constitute from 30 to 97% by weight of the total rubber particles in the composition.

4. The process according to claim 1, wherein the rubber particles in the graft copolymer (B) are particles of a conjugated diene rubber.

5. The process according to claim 4, wherein the particles of the acrylate rubber in the graft copolymer (A) constitutes from 60 to 97% by weight of the total rubber particles in the composition.

6. The process according to claim 1, wherein the polymerization to obtain the graft copolymer (A) is conducted by emulsion polymerization.

* * * * *